Figure 1:
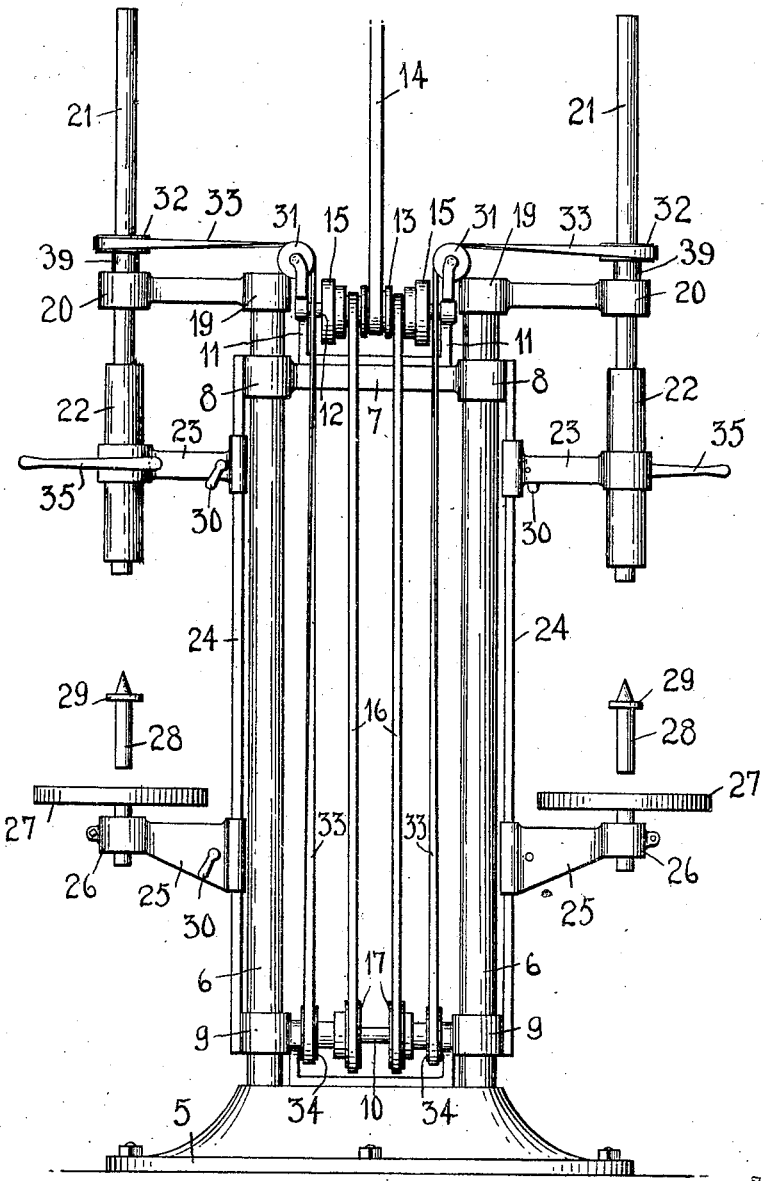

H. E. HAWES.
MULTIPLE DRILL.
APPLICATION FILED AUG. 29, 1907.

925,474.

Patented June 22, 1909.

2 SHEETS—SHEET 1.

Witnesses
L. B. James
E. J. Boehmer

Inventor
H. E. Hawes
By Chandler & Chandler
Attorneys

H. E. HAWES.
MULTIPLE DRILL.
APPLICATION FILED AUG. 29, 1907.

925,474.

Patented June 22, 1909.
2 SHEETS—SHEET 2.

Witnesses
L. B. James
E. J. Boehmer.

Inventor
H. E. Hawes
By Chandler & Chandler
Attorneys

UNITED STATES PATENT OFFICE.

HERBERT E. HAWES, OF MANCHESTER, NEW HAMPSHIRE.

MULTIPLE DRILL.

No. 925,474.　　　　　Specification of Letters Patent.　　　Patented June 22, 1909.

Application filed August 29, 1907. Serial No. 390,663.

*To all whom it may concern:*

Be it known that I, HERBERT E. HAWES, a citizen of the United States, residing at Manchester, in the county of Hillsboro, State of New Hampshire, have invented certain new and useful Improvements in Multiple Drills; and I do hereby declare the following to be a full, clear, and exact description of the invention, such as will enable others skilled in the art to which it appertains to make and use the same.

This invention has reference to multiple drills, and it aims to provide an exceedingly simple, durable, and efficient machine of that class which will occupy but little floor space in a machine shop, and in which either spindle may be run simultaneously with, or independently of the other, and at the same or different speeds, as may be preferred.

With the above and other ends in view, the invention consists in the construction, combination, and arrangement of parts, all as hereinafter fully described, specifically claimed, and illustrated in the accompanying drawings, in which like parts are designated by corresponding reference numerals throughout the several views.

Figure 2:
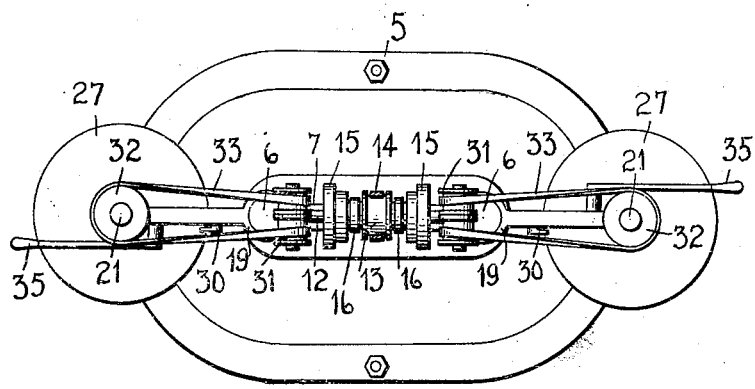

Of the said drawings, Figure 1 is a front elevation of a multiple drill constructed in accordance with the present invention, Fig. 2 is a top plan.

Referring more particularly to the drawings, the numeral 5 designates the base of the machine upon which a pair of uprights 6 are mounted, the uprights being connected, toward their upper ends, by a support 7, each end of which is enlarged, as shown, to form a collar 8, through which the corresponding upright extends, the lower end of each upright passing through a second collar, the last mentioned collars being connected by a horizontal counter shaft 10. The support 7 is further provided with a pair of upstanding brackets 11 in which a horizontal drive shaft 12 is journaled at opposite ends, said shaft carrying a centrally-located pulley 13 driven by an upwardly-extending belt 14, from a source of power, not shown. In addition to the pulley 13 the drive shaft 12 carries a pair of stepped pulleys 15 which are keyed thereto and are disposed upon opposite sides of the above-mentioned pulley, each of the pulleys 15 being connected by a belt 16 with a pulley 17 loosely mounted upon the counter shaft 10. Each upright carries upon its upper end a collar 19 having a laterally-projecting arm formed thereon, upon the outer end of which is formed a second collar 20 through which the corresponding spindle 21 moves, the lower portion of each spindle extending through a sleeve 22 movable in turn through a bracket 23 slidable upon a vertical guide rod 24 fastened at opposite ends to the adjacent collars 8 and 9. Disposed directly beneath each of the brackets 23 is a second bracket 25 which is likewise slidable upon the corresponding guide rod and has a collar 26 formed upon its outer end through which the stem of a platen 27 extends. The platens may be replaced, if desired by centering points 28, each of which has formed thereon a peripheral flange 29 which serves to retain the point in place upon its collar 26. The pairs of brackets 23 and 25 are adjustable toward and from each other to adapt the machine for use in drilling objects of different sizes, each bracket being retained in adjusted position by a set screw 30, or other preferred means.

Each of the brackets 11 is provided with a vertical U-shaped extension having a pin projecting laterally from each arm thereof upon which pins is revolubly mounted a double pulley 31 whose axis lies at right-angles to that of the shaft 12, each of said pulleys being disposed opposite a pulley 32 keyed to the adjacent spindle 21, so as to permit the movement of the latter therethrough. Each of the pulleys 32 is connected by a belt 33 with a pulley 34 which is formed upon or secured to the adjacent face of the corresponding stepped pulley 17, so as to rotate therewith, the belt being twisted across the pulley 31, as shown. It will therefore, be apparent that the spindles may be run at the same or different speeds, according to the engagement of the belts 16 with the steps of the pulleys 15 and 17, and it will likewise be apparent that either belt may be shifted, to change the speed at which the adjacent spindle rotates, without necessitating a corresponding change of the other belt.

The spindles are fed against the work by any preferred means, as for instance, levers 35, each of which is provided with devices for engaging the spindles, said levers being connected with the corresponding bracket 23. The handle end of each lever is weighted to counterbalance the weight of the corresponding spindle.

Each of the collars 20 has formed on its upper face a bushing 39 upon which the adjacent pulley 32 rests, the thickness of said bushings being merely sufficient to support said pulleys without appreciably reducing the speed of rotation thereof.

What is claimed is—

1. The combination, in a multiple drill, of a base; a pair of uprights mounted thereon; a horizontal support connecting said uprights adjacent the upper end thereof and provided at each end with a collar through which the adjacent upright passes; a rotatable vertical spindle disposed adjacent each upright; a work support disposed below each spindle; a pair of brackets mounted upon said support; a transversely-disposed shaft journaled in said last-mentioned brackets; means for rotating said shaft; a pair of stepped pulleys secured to said shaft; a transverse shaft located adjacent the lower end of said uprights; a pair of stepped pulleys loosely mounted upon the lower shaft; a supplemental pulley carried by each of said last-mentioned pulleys; belt connections between the corresponding upper and lower stepped pulleys; and a separate belt connection between each supplemental pulley and the corresponding spindle, for rotating the latter.

2. The combination, in a multiple drill, of a base; a pair of uprights mounted thereon; a horizontal support connecting said uprights adjacent the upper end thereof; and provided at each end with a collar through which the adjacent upright passes; a collar secured to the lower end of each upright; a laterally-extending bracket secured to the upper end of each upright and provided with a collar; a spindle extending through each collar; a pair of brackets mounted upon said support; a transversely-disposed shaft journaled in said last-mentioned brackets; means for rotating said shaft; a pair of stepped pulleys secured to said shaft; a pulley rotatably mounted on each of said last-mentioned brackets; a pulley having a driving connection with each spindle; a transverse shaft journaled at opposite ends in the lower collars on the uprights; a pair of stepped pulleys loosely mounted upon the lower transverse shaft; a supplemental pulley carried by each of the last-mentioned pulleys; belt connections between the corresponding upper and lower stepped pulleys; and a separate belt connection between each supplemental pulley and the corresponding spindle pulley for rotating the latter, each of the last-mentioned belts being crossed against the adjacent-carried pulley.

In testimony whereof, I affix my signature, in presence of two witnesses.

HERBERT E. HAWES.

Witnesses:
 JOHN W. CENTER,
 LIZZIE HARVEY.